United States Patent [19]
Dwyer

[11] 3,850,064
[45] Nov. 26, 1974

[54] DIE FOR CUTTING STACKED SHEET MATERIAL

[75] Inventor: Ralph J. Dwyer, Clayton, Mo.

[73] Assignee: Independent Die and Supply Company, St. Louis, Mo.

[22] Filed: Jan. 10, 1974

[21] Appl. No.: 432,218

[52] U.S. Cl. .................. 83/124, 83/128, 83/139, 83/582, 83/620, 83/691
[51] Int. Cl. ........ B26d 7/06, B26d 1/10, B26d 3/24
[58] Field of Search ............ 83/128, 139, 140, 582, 83/620, 691, 124

[56] References Cited
UNITED STATES PATENTS
1,167,976  1/1916  Campbell ............................. 83/140
3,167,985  2/1965  Madsen ................................ 83/139
3,373,643  3/1968  Spengler ............................. 83/620

*Primary Examiner*—Willie G. Abercrombie
*Attorney, Agent, or Firm*—Gravely, Lieder & Woodruff

[57] ABSTRACT

A die assembly has individual cutting dies arranged on a base such that the dies will slide relative to the base but cannot be withdrawn therefrom. Resilient means urge the dies together. As a result, the spacing between the dies will enlarge slightly to prevent cut scrap material from lodging tightly in the gaps between the dies and consequently breaking the dies.

7 Claims, 4 Drawing Figures

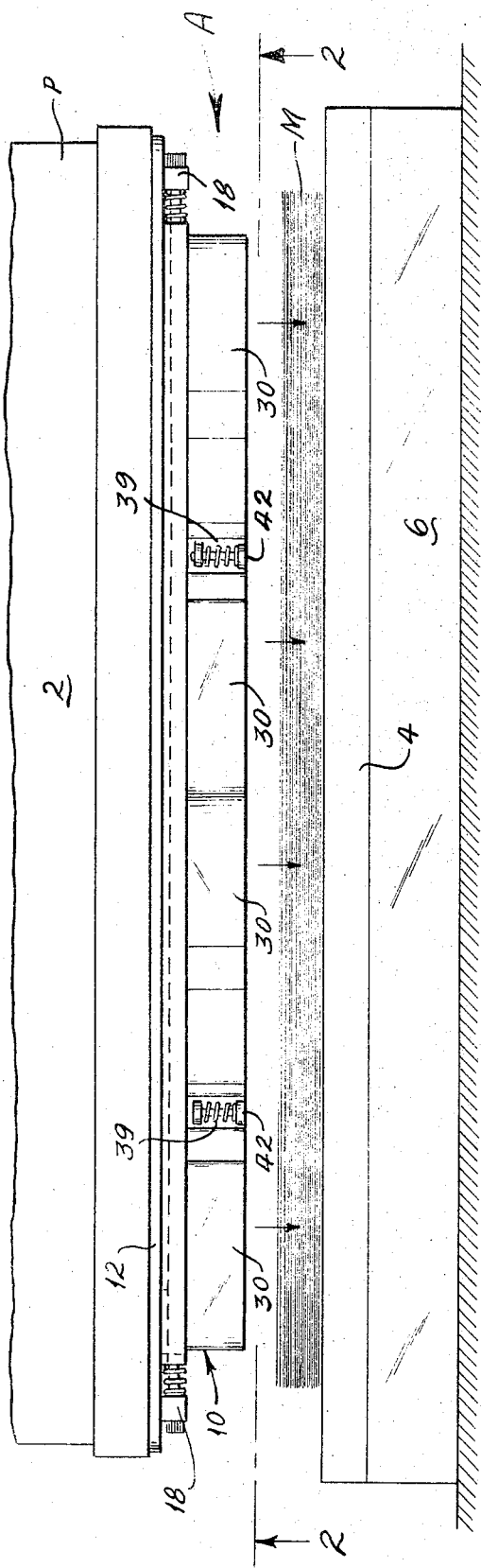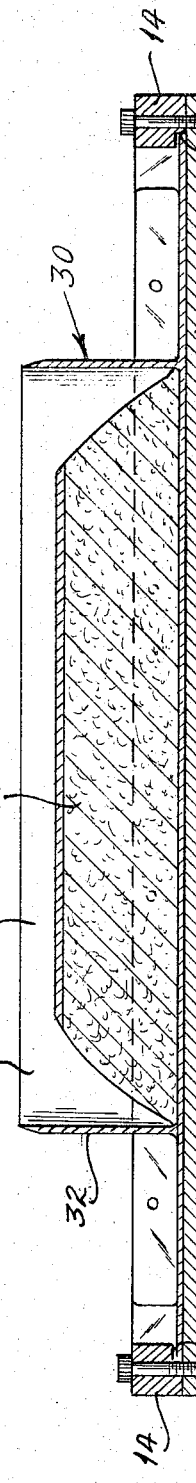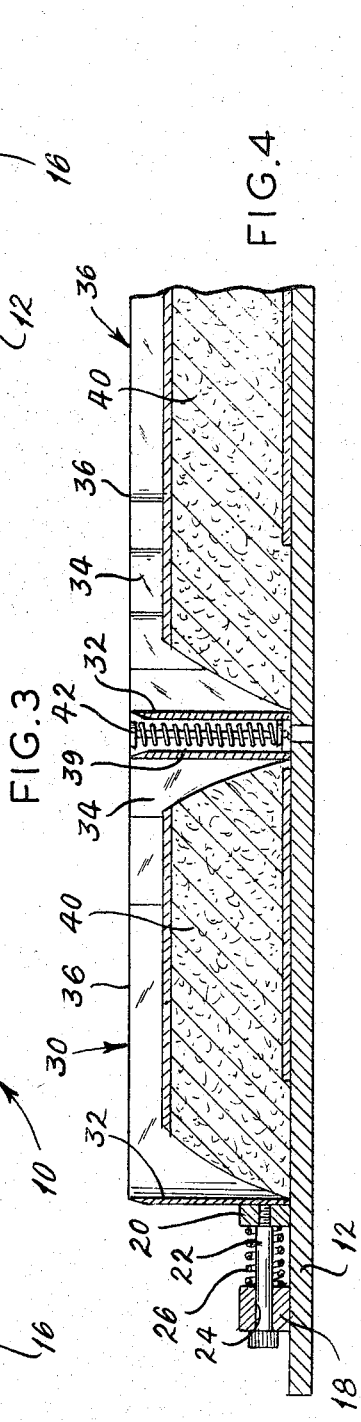

DIE FOR CUTTING STACKED SHEET MATERIAL

BACKGROUND OF THE INVENTION

This invention relates to dies and more particularly to dies for cutting stacked sheet material such as cloth.

In the manufacture of clothing and other goods from sheet material on a mass production basis, it is desirable to cut the individual pieces by means of dies which pass through a multitude of material layers. To increase production still further it is customary to employ gang dies, that is several dies positioned side-by-side so that a single stroke of the press ram results in several pieces being cut from each layer of cloth. The disadvantage of this arrangement resides in the tendency of the scrap material to lodge between the individual dies and clog and break the die structure. Automatic clearing or ejecting devices are not too successful in removing this material and as a result it must often be removed by hand. This retards the entire die cutting operation, making it not nearly as efficient as it might otherwise be. Also, the pressure of the material between fixed dies causes breakage of the dies, if the dies do not move apart.

SUMMARY OF THE INVENTION

One of the principal objects of the present invention is to provide a die assembly containing gang dies for cutting layered material with a minimum tendency to jam and break. Another object is to provide a die assembly of the type stated which is quickly and easily disassembled to repair the dies therein or replace them with dies of a different configuration. These and other objects and advantages will become apparent hereinafter.

The present invention is embodied in a die assembly including a base and individual cutting dies which can move on the base to increase the spacing between the dies. Resilient means are provided for urging the dies together. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur:

FIG. 1 is an elevational view of a punch press provided with a die assembly constructed in accordance with the present invention;

FIGS. 3 and 4 are sectional views taken along lines 3—3 and 4—4, respectively of FIG. 2.

DETAILED DESCRIPTION

Figure 2:
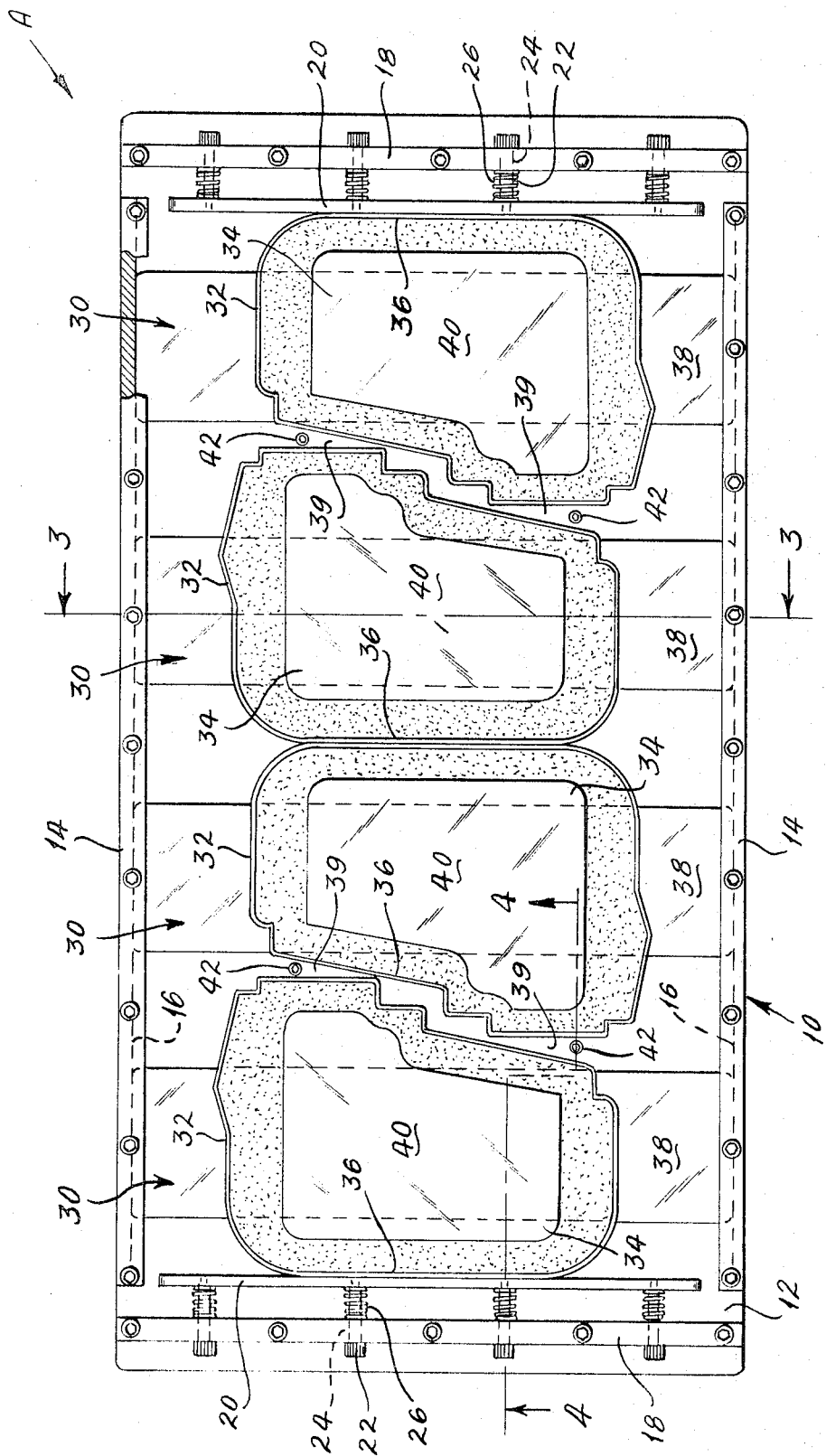
FIG. 2 is a plan view of the die assembly taken along lines 2—2 of FIG. 1.

Referring now to the drawings (FIG. 1), A designates a die assembly which is mounted on the ram 2 of a press P and moves toward and away from a platen 4 on the press bed 6. The platen 4 supports sheet material M which is usually stacked in layers. The sheet material M is usually cloth.

The die assembly includes a base 10 which is secured firmly to the press ram 2. The base 10 has a base plate 12 and parallel slide rails 14 (FIGS. 2 and 3) extending along the sides of the base plate 10. The slide rails 14 are bolted to the base plate 12 and have grooves 16 therein which open inwardly. Bolted to and extending along the ends of the base plate 12 are backing bars 18 (FIGS. 2 and 4) on which retractable pressure bars 20 are mounted with the pressure bars 20 being located inwardly from the backing bars 18. The pressure bars 20 have guide stubs 22 fixed rigidly in them and projected rearwardly through guide holes 24 in the backing bars 18. The guide stubs 22 also project through coil-type compression springs 26 which are located between the pressure bars 20 and the backing bars 18 for urging the pressure bars 20 inwardly toward each other. Other resilient devices may be used to urge the pressure bars 20 together in lieu of the springs 26. For example, an elastomeric material may be employed.

The base 10 supports a plurality of individual cutting dies 30 which are retained by the slide rails 14 and are urged together by the two pressure bars 20. In particular, each cutting die 30 includes a cutting wall 32 which closes upon itself to enclose a die cavity 34. The die cavity 34 opens toward the platen 4 on the press bed 6 and its entrance is bordered by a sharp cutting edge 36 on the cutting wall 32. The cutting wall 32 is attached to a mounting plate 38 which underlies the base plate 12 of the base 10. Moreover, the mounting plate 38 extends transversely of the base plate 12 beyond the cutting wall 32 and its ends project into the grooves 16 in the slide rails 14 of the base 10 (FIGS. 2 and 3). This enables the cutting dies 30 to slide along the base 10, but prevents them from being withdrawn therefrom. The cutting dies 30 are positioned side-by-side along the base 10 with the cutting walls 32 of adjacent dies abutting. Where cutting walls 32 of two adjacent dies 30 abut, it is not necessary that the shapes of those walls complement each other. On the contrary, there may be gaps 39 (FIG. 2) between the cutting walls 32 of adjacent dies. The pressure bars 20 engage the outermost portions of the cutting walls 32, for the two endmost dies 30, and this has the effect of urging all of the dies 30 together. In other words, when the dies 30 are properly positioned on the base 10, their combined length exceeds the distance between the unrestrained pressure bars 20. As a result the springs 26 or other resilient devices are compressed and urge the dies 30 together into a compacted condition.

Each die 30 contains an ejector 40 within its die cavity 34 (FIGS. 2–4). The ejector 40 is compressed by sheet material M entering the cavity 34, and when so compressed it urges the sheet material M outwardly so that the material M does not become lodged in the die cavity 34. The ejectors 40 may be an elastomeric material.

Also, where gaps 39 exist between the cutting walls 32 of adjacent dies 30, one of the cutting walls 32 is provided with an ejector 42 (FIG. 4), in the gap 39. These ejectors 42 are driven inwardly to a retracted position by scrap material M entering the gaps 39 between the dies 30 and when the driving force is relieved, the ejectors 42 dislodge the scrap from the gaps 39 so that the gaps 39 do not become clogged. The ejectors may be spring loaded.

OPERATION

In use, a plurality of layers of sheet material M is placed on platen 4 of the press P with the press ram 2 in its retracted position. Once the layers of sheet material M are properly positioned beneath the die assembly A, the press P is energized to drive its ram 2 downwardly. This, of course, drives the die assembly A downwardly and causes the cutting edges 36 of the individual cutting dies 30 to enter and cut through the layers of sheet material M. When the ram 2 has completed its stroke, the cut pieces of sheet material M are in the cavity 34, while the scrap surrounds the cutting walls 32. Both the cut pieces and scrap remain in a layered or stacked condition. Moreover, the cut pieces compress the ejector 40, while the portions of scrap in the gaps 39 between the individual dies 30 compress the ejectors 42. When the ram 2 is retracted to withdraw the die assembly A from the platen 4, the ejectors 40 expand and force the cut pieces out of the die cavities 34. Likewise, the ejectors 42 force the scrap out of the gaps 39 between the adjacent cutting walls 32. Since the individual die cavities 34 are not fixed in position on the base 10, but instead are free to move against the resilient loading imposed by the pressure bars 20, the gaps 39 will enlarge slightly to accommodate the scrap. This prevents the scrap from building up pressure which can break the die walls. Also, the scrap does not become lodged tightly in the gaps 39, and as a result the ejectors 42 easily dislodge the scrap so that it falls free of the die assembly A as the press ram 2 retracts.

The individual cutting dies 30 may be removed for repair or replacement by detaching one of backing bars 18 from the base plate 12 and sliding the mounting plates 38 out of the ends of the grooves 16 in the slide rails 14 or by detaching one of the slide rails. The cutting dies 30 may be replaced with cutting dies of different size and configuration.

This invention is intended to cover all changes and modifications of the example of the invention herein chosen for purposes of the disclosure which do not constitute departures from the spirit and scope of the invention.

What is claimed is:

1. A die assembly for cutting layered sheet material; said die assembly comprising: a base, individual cutting dies mounted side-by-side on the base and at least some of the dies being shiftable in the direction which increases the spacing between adjacent dies, and resilient means urging the dies together.

2. A die assembly according to claim 1 wherein the dies include cutting walls which define die cavities and have cutting edges thereon at the entrance to the cavities, the cutting walls of adjacent dies abutting one another.

3. A die assembly according to claim 2 wherein the base has slide rails provided with opposed grooves; and the individual dies include mounting plates which project beyond the cutting walls and into the grooves of the slide rails, whereby the dies can slide relative to each other, but cannot be withdrawn from the base.

4. A die assembly according to claim 2 wherein the resilient means includes backing bars mounted firmly on the base, adjacent the endmost cutting dies, pressure bars mounted on and shiftable relative to the backing bars for engaging the endmost dies, and a resilient element between the backing bars and pressure bars for urging the pressure bars and the dies together.

5. A die assembly according to claim 3 wherein the base further includes a base plate which overlies the cutting dies, the slide rails being mounted rigidly on the base plate and the mounting plates of the dies being directly against the base plate.

6. A die assembly according to claim 2 wherein the abutting portions of the cutting walls on at least some of the dies are not complementary so that gaps exist between the dies, and wherein ejectors are positioned in the gaps for dislodging scrap material therein.

7. A die assembly according to claim 2 and further characterized by resilient ejectors in the die cavities for urging pieces of cut sheet material out of the cavities.

* * * * *